United States Patent [19]

Franconi

[11] 3,732,488
[45] May 8, 1973

[54] ELECTRON SPIN INDUCTORS AT MICROWAVES

[76] Inventor: Cafiero Franconi, Via delle Epodi 13B, Cagliari, Italy

[22] Filed: Apr. 13, 1972

[21] Appl. No.: 243,796

Related U.S. Application Data

[63] Continuation of Ser. No. 863,970, Oct. 10, 1969, abandoned.

[30] Foreign Application Priority Data

Oct. 5, 1968 Italy..............................40247 A/68

[52] U.S. Cl. .................................................324/.5 R
[51] Int. Cl. .............................................G01n 27/78
[58] Field of Search ..............324/.5 R, .5 A, .5 AC, 324/.5 AH; 340/173 NI

[56] References Cited

UNITED STATES PATENTS

| | | | |
|---|---|---|---|
| 3,197,692 | 7/1965 | Hyde | 324/.5 |
| 3,371,271 | 2/1968 | Takeuchi | 324/.5 |
| 3,529,235 | 9/1970 | Day | 324/.5 |
| 3,559,043 | 1/1971 | Hyde | 324/.5 |
| 3,072,890 | 1/1963 | Smith | 340/173 |

OTHER PUBLICATIONS

D. T. Teaney, M. P. Klein and A. M. Portis, Microwave Superhetrodyne Induction Spectrometer, Rev. of Sci. Instr. 32(6), July, 1961, pp. 721-729.

Primary Examiner—Michael J. Lynch
Attorney—Jacobi, Davidson & Kleeman

[57] ABSTRACT

Resonant structures supporting two decoupled degenerate orthogonal modes of oscillation of microwaves for magnetic resonance spectrometers employing the Bloch spin induction principal are disclosed. The bimodal microwave cavities used therein include a region where the sample of matter containing the spins under study is placed within the bimodal cavity to be stimulated by the microwave field of the first mode. The energy emitted by the stimulated spins is extracted from the second mode of said bimodal cavities. Balanced mode coupling to the cavities and multiple bimodal cavity systems sharing a unimodal region are disclosed together with means for reducing the cross coupling of the orthogonal modes inside the bimodal structure.

11 Claims, 15 Drawing Figures

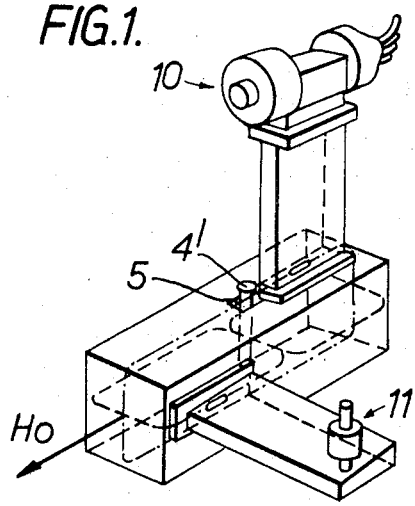
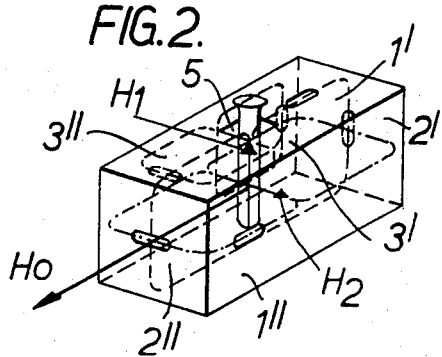
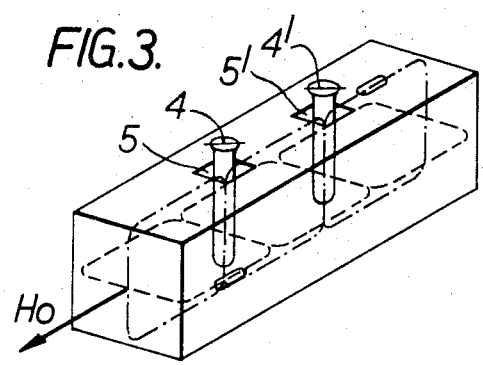
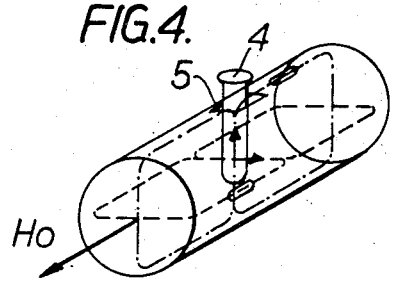
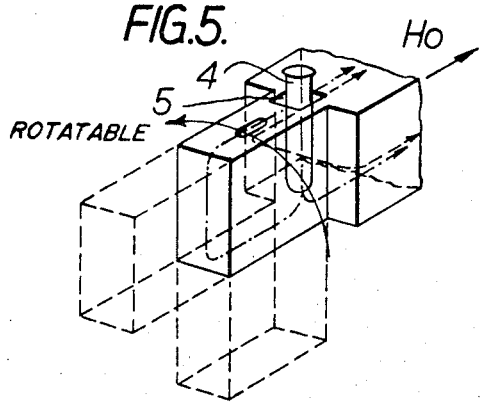
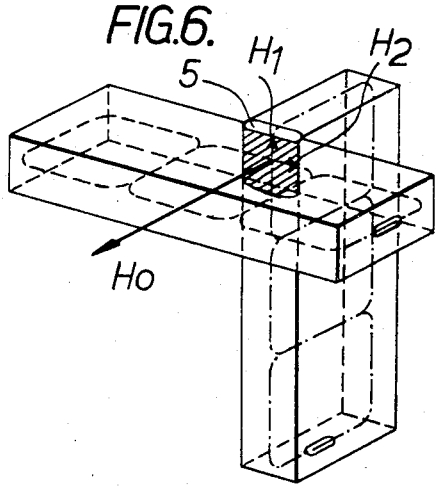

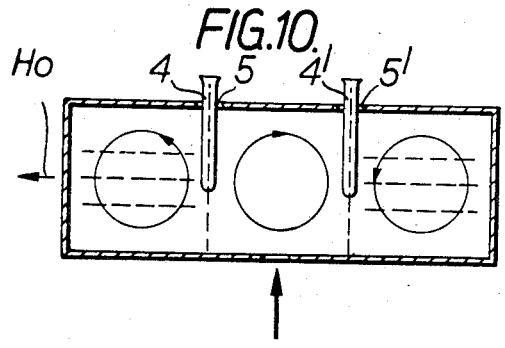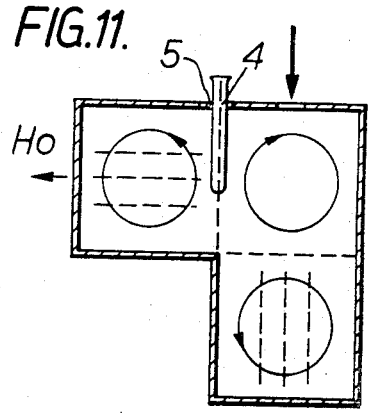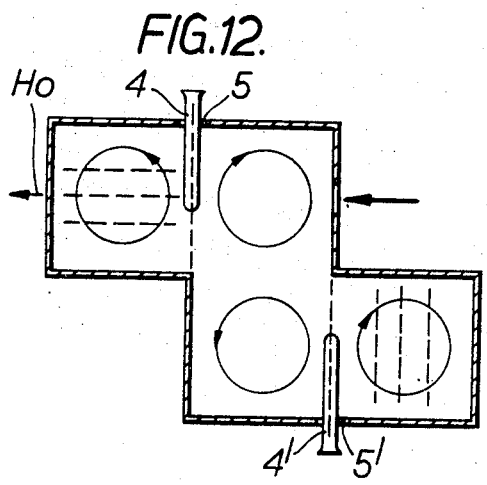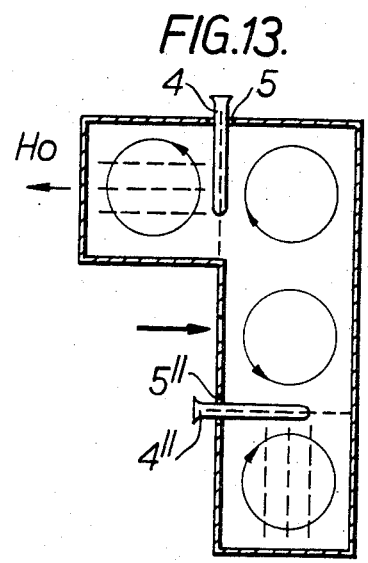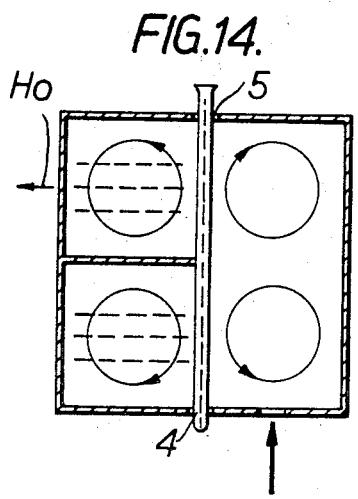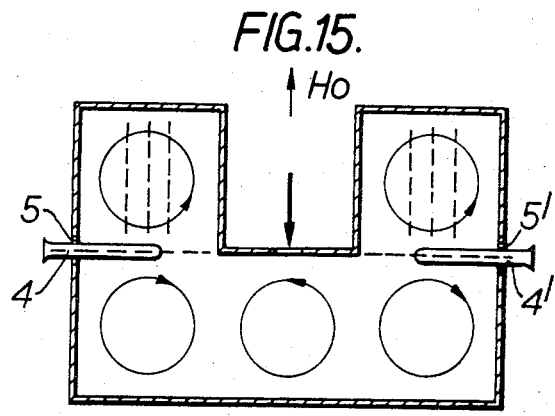

ELECTRON SPIN INDUCTORS AT MICROWAVES

This application is a continuation of application Ser. No. 863,970, filed Oct. 10, 1969, and now abandoned.

The present invention refers to electron spin inductors at microwaves for use as electron spin magnetic resonance spectrometers using the spin induction principle.

The spin induction method was proposed in 1946 by Bloch for the nuclear spin. It is based in the fact that a radiofrequency field $H_1$ generated by a coil wound around the nuclear spin sample, induces nuclear spin transitions with the emission of radiation characterized by a magnetic field vector $H_2$ of the same frequency but polarized at right angle with respect to $H_1$, which is picked up by a second coil having its axis perpendicular to the first. Both coil axes must also be perpendicular to the static magnetic field $H_0$ generated by a magnet.

This theory may be applied to the electron spins, making possible a spectroscopy of this kind also for the electrons. However in this case the frequencies will fall in the microwave range.

Although this method had been successfully applied to the design of nuclear induction spectrometers, the few attempts made to build electron induction spectrometers do not represent practical solutions of the problem.

In all the known systems infact either a sample substitution or a small thermal or mechanical modification of the resonating cavity and associated tuning and balancing plugs will provoke marked changes on the working conditions introducing microwave energy in the detector waveguide. Such energy, generally fluctuating will be superimposed to the induced signal of the sample. Thus the baseline of the spectrometer recorder will analogously fluctuate, making impossible a quantitative analysis and difficult a qualitative analysis of the resonance. Furthermore, a sample substitution modify so much the working conditions of such cavities that new tedious operations of readjustment are always necessary.

On the other hand disadvantages of the same type are encountered in the electron paramagnetic resonance spectrometers actually on the market, whose principle of operation is based on the energy absorption at resonance by the electronic spins. These spectrometers use resonating reflex cavities coupled to magic Tee or circulators.

The inductor relative to this invention is characterized by a bimodal system allowing the simultaneous presence of two degenerate oscillation modes of any frequency for the electromagnetic field. The two modes belong to the exciting and induced fields respectively and are polarized at right angle and decoupled.

The bimodal system consists of a cavity at least resonating for the exciting mode and two irises or analogous devices for introducing the exciting energy and picking up the induced energy respectively, containing also a cell in which the spin sample is placed, the whole system being exposed to a static magnetic field.

The invention will be better understood with the aid of the enclosed drawings relative to some practical examples of electronic inductors.

FIG. 1 shows the basic arrangement of an electron resonance induction spectrometer using a bimodel cavity of the present invention.

FIGS. 2–15 show additional configurations of the cavity structure of the instant invention.

Figure 7:
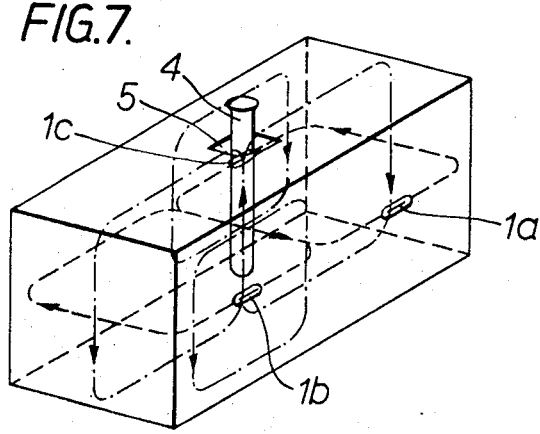

FIG. 1 shows a simplified block diagram of a magnetic resonance spectrometer working with the spin induction principle incorporating features of the present invention. In FIG. 1 is shown a bimodal microwave cavity 6 of square cross section of the present invention. The cavity exhibits aperture means 5 to allow spin sample 4' to be inserted into the bimodal cavity volume. The klystron 10 excites the first mode of said bimodal cavity through a waveguide and coupling input iris whose microwave field stimulates the spins and the energy emitted by the stimulated spins excites the cavity second orthogonal mode whose energy is coupled through the output iris to detector 11.

The simplest inductor according to this invention is the one of FIG. 2. The $TE_{012}$ mode is excited by the microwave energy introduced in the cavity through iris 1' and sets up the field $H_1$. A sample made up of a cell of glass, quartz of similar material, containing the electron spins, is inserted through hole 5 and is exposed to the force lines of the field $H_1$. The signal induced by the electron spins of the sample excites only the second degenerate mode ($TE_{102}$), giving rise to a magnetic field $H_2$ perpendicularly polarized to the former. The energy of this mode is conveyed to the detector by a waveguide (not shown) through iris 1''. Irises 1' and 1'' are placed in such a way as to couple their respective input and output waveguides preferentially to only one of the degenerate modes.

The output iris may instead be placed as 2'' of FIG. 2 (on the end wall) or as 3'' of FIG. 2 (on the third wall). Similar positions such as 2' and 3' of FIG. 2 might be given to the input iris.

Cavities of square or rectangular cross section working in the superior TE or TM modes, also fall within the scope of the present invention.

In the FIGS. from 2 to 6 examples of some of the systems are presented utilizing bimodal cavities responding to the requirements of a low overall direct coupling between klystron (not shown) and detector (not shown), to be used as practical spin inductors working at any radio frequency.

In FIG. 2 the principal body of a bimodal cavity working in the $TE_{012}$ and $TE_{102}$ modes is shown. Such a body is extended only for two half wavelengths along the direction of propagation, but it could be extended any integral number of $\lambda/2$ (indicating with $\lambda$ the wavelength). In FIG. 3 is shown, as an example, the central body of a bimodal cavity ($TE_{013}$ and $TE_{103}$) which extendes itself for 3 ($\lambda/2$) and contains two samples instead of one, for superimposed resonances experiments. In FIG. 4 a bimodal body having cylindrical symmetry and extended for 2 ($\lambda/2$) and which might work on the $TE_{112}$ modes, or in general in the $TE_{11n}$ modes, is shown.

One may profitably add or substitute for one or more ($\lambda/2$) length of the principal body of a bimodal cavity, one or more unimodal sections ($TE_{01n}$) such as in FIG. 5. In this way one obtains a better polarization of the relative mode and a diminution of the effect of the iris in exciting the other mode therefore obtaining a smaller coupling between degenerate modes. The unimodal sections may conveniently substitute for all the irises of the type 1, 2 and 3 of FIG. 2, relative to both modes.

The extension of these unimodal sections may be of one or more ($\lambda/2$). In FIG. 5 dashed contours show how this extension could be accomplished. The new iris may be located in places different from that indicated in FIG. 5, according to known practical rules.

If one of these unimodal sections is used for the $H_1$ mode, hen the sample 4 may be inserted through hole 5 along the force lines of $H_1$ as in FIG. 5, without significantly disturbing the cavity symmetry. On the other hand, unimodal sections without irises but similar to the ones described above may be properly coupled to bimodal cavity sections to further polarize the modes of the cavity.

In the case of a cavity carrying both bimodal and unimodal sections it might be possible to diminish the direct coupling between Klystron and detector building the cavity itself in at least two pieces coupled mechanically to make possible a mutual rotation of the different sections along their separation plane about an axis coinciding with the direction of the propagation, thus compensating the possible differences from 90° of the polarization planes of the two modes.

In FIG. 6 a bimodal system designed with the only use of resonating unimodal sections ($TE_{01n}$) is shown. The sample is inserted through slot 5 on the ideal plane where the magnetic force lines of both modes cross at right angle.

Figure 8:
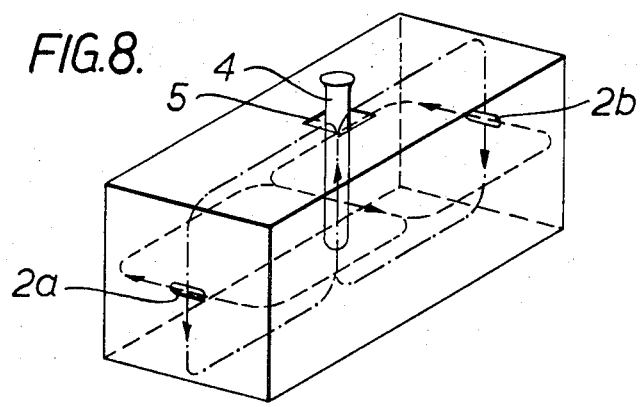
Figure 9:
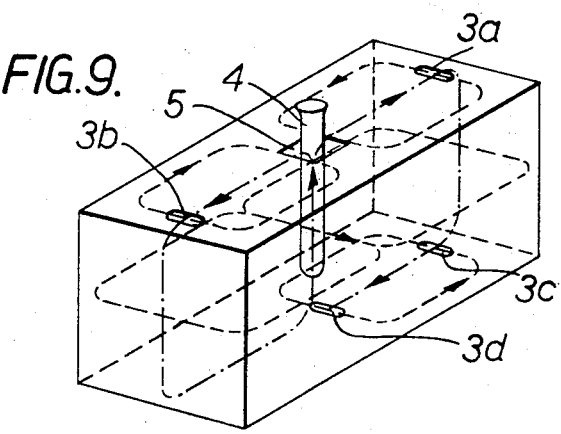

Balanced output systems may be used in a bimodal cavity in order to diminish the residual coupling between klystron and detector and reduce signal fluctuations. Balanced output systems in which the signals due to the unwanted coupling through the output irises are balanced to zero may be discussed with the aid of FIGS. 7, 8 and 9. The balanced pick up systems of the induction signal from a bimodal body may be obtained by using as an example one of the following couples of output irises: $1a/1c$; $1b/1a$; $3a/3b$; $3a/3c$ and $3c/3d$ shown in FIGS. 7, 8 and 9. Symmetrical combinations of these irises or of irises different from those indicated above are of course possible to obtain a balanced output. Infact the spurious signal coupling the klystron to the detector is mostly due to the effects of the currents of the field $H_1$ on the output iris, therefore resulting in a precise phase relationship with it. One may therefore pick up two induction signals through two symmetrical irises properly placed in such a way that the coupling signals exhibit opposite (or same) phase, while the induction signals exhibit same (or opposite) phase respectively. Making use of T-junctions on the E, or H plane or analogous device, opportunely oriented and coupled to both irises it is possible to obtain at the output arm of the junction the sum of the induction signals together with the difference of the coupling signals. The latter ones may then be balanced to zero. Analogous results may be obtained with a cavity of mixed type bimodal/unimodal, if one senses the induction signals.

It is further possible to supply microwave power to the exciting mode of a cavity in a balanced way either, through a couple of symmetrical irises or through a couple of symmetrical unimodal sections and utilizing a T-junction or analogous device in such a way as to take care of the phase of the exciting field at the irises. With the use of such balanced systems one might largely increase the polarization of the exciting mode while simultaneously reducing the unwanted effects of the input iris or unimodal section. The iris configurations shown in FIGS. 7, 8 and 9 which can be used for the symmetrical pick-up of the signal may reversibly be used also for a symmetrical supply of the cavity. Iris configurations other than these may profitably be used for the same purpose.

A balanced inductor system may also be obtained by a combination of two sections excited through a single unimodal section extended for any number of half wavelengths. On the other hand the combination of two bimodal cavities with a unimodal section may be made in several ways also according to the length the latter. In FIGS. from 10 to 15 some of the possible combinations with unimodal sections of $\lambda/2$ (FIGS. 10 & 11) of ($\lambda/2$) (FIGS. 12, 13 and 14) and of $3(\lambda/2)$ (FIG. 15) of extension are shown. As stated above, with the aid of T-junctions properly oriented (not shown in the Figures) one might pick up the induction signals added together, while balancing to zero the spurious coupling signals through the most appropriate iris configurations.

Such systems may work with a single resonating sample 4 inserted through hole 5 in one bimodal cavity, while a second sample 4'' is inserted through hole 5'' in the second bimodal cavity. The latter sample might for instance contain only the solvent and in this case it would only be used to load symmetrically both cavities with respect to the electric field. Some of the models shown (FIGS. 11 and 13) could work only in this way. These dual cavity systems may generally be used also with two different spin samples, 4 and 4' one for each cavity, for superimposed resonance experiments.

In all the described systems, the bimodal section may be made aperiodic in the induced mode by using output irises of proper size and resonating the excitation mode. In this case the microwave energy transfer toward the detector will be easier and a separate tuning for the second mode will be avoided.

The invention described herein is the microwave analog of the device built for nuclear induction in the radio frequency range. The use of linearly polarized waves and of cavities of proper geometry and high symmetry together with the described design allows the insulation between the detector and klystron to reach about 90db, to be compared to the 45db relative to the crossed coil nuclear inductors.

The advantages of the inductors relative to this invention with respect to the known ones are many and very important. First of all mechanic/thermal fluctuations of the cavity and sample substitution do not appreciably affect the klystron-detector coupling, so that there is not baseline fluctuation due to this cause. Furthermore oscillator fluctuations are not directly sensed by the detector any more, even in the systems having unsymmetrical output. These advantages therefore classify the type of inductor here described well above any microwave ESR spectrometer known till today.

On the other hand any combination of the components described above may lead to a spin induction spectrometer which will exhibits the fundamental advantages described above, being the principle relative to the invention of general nature and being capable of being built in many different ways from those described above, which however will fall within the scope of my invention.

What the claims are:

1. In a spin induction spectrometer for magnetic resonance measurements on a spin sample:
   a. means defining a bimodal resonant composite microwave structure including therein at least one intrinsically bimodal cavity of square cross-section;
   b. said intrinsic bimodal cavity having aperture means permitting a spin sample to be introduced therein;
   c. an external source of microwave energy and an external microwave detecting device;
   d. said intrinsic bimodal cavity supporting two modes degenerate in frequency, the first of said modes being excited by the external microwave energy and used for stimulating the spins and the second of said modes excited by the microwave energy irradiated by the stimulated spins at resonance, said first mode being polarized and orthogonal to said second mode, said second mode also being polarized and decoupled from said first mode;
   e. said microwave structure having further aperture means acting as a polarized coupling device such that said external source of microwave energy is coupled only to said first mode, and additional aperture means acting as a second polarized coupling device coupling the second mode to said external microwave detecting device, said further and additional aperture means having respective polarization planes orthogonal and thereby being decoupled from each other;
   f. said intrinsic bimodal cavity supporting the oscillation of any integral number of half wavelengths in each of the two modes, the two said modes forming pairs of decoupled degenerate orthogonal modes;
   g. said intrinsic bimodal cavity being oriented in an external static magnetic field such that throughout the volume occupied by the spin sample the direction of said static magnetic field is perpendicular to the two orthogonal microwave magnetic field vectors of the said two modes.

2. A microwave composite structure as recited in claim 1 wherein said structure;
   a. comprises one unimodal section supporting only said first resonant mode and said intrinsic bimodal cavity of square cross-section supporting said first and second modes, said unimodal section being coupled to said intrinsic bimodal cavity through a common opening therebetween, said unimodal section forming a common composite resonant cavity for said first mode with said intrinsic bimodal cavity;
   b. said unimodal section forming said first polarized coupling device for said first mode of said intrinsic bimodal cavity;
   c. said unimodal section including aperture means coupling the external source of microwave energy to said first mode, the microwave energy propagating from said unimodal section to said intrinsic bimodal cavity;
   d. said structure including means for adjusting the microwave polarization plane of said unimodal section with respect to the polarization plane of the second mode of said intrinsic bimodal cavity, said means for adjusting being disposed between said unimodal section and said intrinsic bimodal cavity for decreasing the coupling between said two modes, said means for adjusting comprising means for mutually rotating the two respective microwave supportive structures about a binary symmetry axis of the cavity parallel to the intersection of the polarization planes of said first and second orthogonal modes of said intrinsic bimodal cavity.

3. A microwave composite structure as recited in claim 1 wherein said structure:
   a. comprises a unimodal section supporting only one resonant mode and said intrinsic bimodal cavity of square cross-section supporting said first and second modes, said unimodal section being coupled to said intrinsic bimodal section through an opening therebetween, said unimodal section forming a common composite resonant cavity for said second mode with said intrinsic bimodal section;
   b. said unimodal section forming said polarized coupling device relative to said second mode of then intrinsic bimodal cavity;
   c. said unimodal section including aperture means for coupling only said second mode whose microwave energy comes from the stimulated spins to an external microwave detector;
   d. said structure including means disposed between said unimodal section and said intrinsic bimodal cavity for decreasing the coupling between said first and second modes, said means disposed between adjusting the microwave polarization plane of said unimodal section with respect to the polarization plane of the first mode of said intrinsic bimodal cavity through a mutual rotation of both said sections about an axis defined by the intersection of the polarization planes of said first and second orthogonal modes of said intrinsic bimodal cavity.

4. A microwave composite structure as recited in claim 1, wherein said additional aperture means acting as said second polarized coupling device includes a pair of elongated slots in the walls of said intrinsic bimodal cavity, said slots being elongated in a direction parallel to the magnetic lines of said second mode, signal combining means having three ports with two of said ports being connected to respective ones of said pair of slots for producing a combined output at the third port corresponding to a vector sum of the spin resonance signals extracted via said pair of slots from said second mode, said slots being placed in selected positions of selected cavity walls such that the directions of the vectors of the microwave magnetic fields of the first and second mode at their positions have the same and opposite symmetry characteristics, respectively, with respect to the third port.

5. A microwave composite structure as recited in claim 2, wherein said structure comprises:
   a. a plurality of intrinsic bimodal cavities each capable of supporting said first and second modes, and a single unimodal section supporting only one mode coinciding with the first mode of said structure and coupled to each of said intrinsic bimodal cavities through common openings therebetween, said unimodal section forming a common composite resonant cavity for said first mode with all of the said intrinsic bimodal cavities;

b. said single unimodal section including aperture means coupling the external source of microwave energy to said first mode;

c. each aperture means of said intrinsic bimodal cavities capable of permitting respective spin samples to be introduced into them;

d. each aperture means of said intrinsic bimodal cavities acting as respective second polarized coupling devices such that each of their second modes may be coupled to the respective external microwave detector.

6. In a spin induction spectrometer for magnetic resonance measurements on a spin sample:

a. means defining a bimodal composite resonant microwave structure, including therein at least one multimode cylindrical cavity; and b. polarized coupling devices means for allowing exchange of microwave energy with an outside microwave generator and a detector respectively of only two orthogonal degenerate modes of the said multimode cavity such that with regard to microwave energy transfer in either way the multimode cavity serves as an overall bimodal cavity with well defined orthogonal degenerate modes;

c. said first polarized coupling device being used to excite only the first mode of said overall bimodal cylindrical cavity this mode being used for stimulating the spins by coupling the external microwave energy to it;

d. said second polarized coupling device being used for coupling only the second mode of said overall bimodal cylindrical cavity excited by the microwave energy irradiated by the stimulated spins at resonance to an external microwave detector;

e. said overall bimodal cylindrical cavity having aperture means such that a spin sample may be introduced into it;

f. said first mode being orthogonal to said second mode and thereby being decoupled therefrom;

g. said two coupling devices being polarized at right angles and thereby being mutually decoupled therefrom;

h. said overall bimodal cylindrical cavity being so oriented in an external static magnetic field such that throughout the volume occupied by said spin sample the direction of said static magnetic field is perpendicular to both orthogonal microwave magnetic field vectors of the two said modes;

i. said two modes being pairs of decoupled degenerate orthogonal modes oscillating for any number of half wavelengths.

7. A microwave composite structure as recited in claim 6, wherein said two polarizing coupling devices comprise two thin rectangular irises placed on the cavity walls, said irises determining unequivocally the bimodal character of said cylindrical cavity.

8. A microwave composite structure as recited in claim 6, wherein said structure:

a. comprises one unimodal section supporting only one resonant mode and one said overall bimodal cylindrical cavity, said unimodal section being coupled to said overall bimodal cylindrical cavity through a common opening therebetween to form a common composite resonant cavity for one mode which coincides with said first mode of said overall bimodal cavity;

b. said unimodal section forming said first polarized coupling device for said first mode of said overall bimodal cylindrical cavity;

c. said unimodal section including aperture means coupling the external source of microwave energy to its mode, the microwave energy propagating from said unimodal section to said overall bimodal cylindrical cavity;

d. said structure including means disposed between said unimodal section and said overall bimodal cylindrical cavity for reducing the coupling between said two modes at minimum, said means disposed between adjusting the microwave polarization plane of said unimodal section with respect to the polarization plane of the second mode of said overall cylindrical bimodal cavity through their mutual rotation about the cylindrical axis of said cylindrical cavity.

9. A microwave composite structure as recited in claim 6, wherein said structure:

a. comprises one unimodal section supporting only one resonant mode and one said overall bimodal cylindrical cavity, said unimodal section being coupled to said cylindrical cavity through a common opening therebetween and forming a common composit resonant cavity for a single mode which coincides with said second mode of said overall bimodal cavity;

b. said unimodal section forming said second polarized coupling device for said second mode of said overall bimodal cylindrical cavity, c. said unimodal section including aperture means for coupling its mode excited by the polarized radiation emitted by the stimulated spins to an external microwave detector;

d. said structure including means disposed between said unimodal section and said overall bimodal cylindrical cavity for decreasing the coupling between said two modes, said means disposed between adjusting the microwave polarization plane of said unimodal section with respect to the polarization plane of the second mode of said overall bimodal cylindrical cavity through their mutual rotation about the cylindrical axis of said cylindrical cavity.

10. A microwave composite structure as recited in claim 6, wherein said polarized device includes a pair of elongated slots in the walls of said overall bimodal cylindrical cavity, said slots being elongated in a direction parallel to the magnetic lines of said second mode, signal combining means having three ports with two of said ports being connected to respective ones of said pair of slots for producing a combined output at the third port corresponding to a vector sum of the spin resonance signals extracted via said pair of slots from said second mode, said slots being placed in selected positions of selected cavity walls such that the directions of the vectors of the microwave magnetic fields of the first and second mode at their present positions have the same and opposite symmetry characteristics, respectively, with respect to the third port.

11. A microwave composite structure as recited in claim 8, wherein said structure comprises:

a. a plurality of overall bimodal cylindrical cavities each capable of supporting said first and second modes, and a single unimodal section supporting only one mode coinciding with the first mode of said structure and coupled to each of said overall bimodal cavities through common openings therebetween said unimodal section forming a common composite resonant cavity for said first mode with all the said overall bimodal cylindrical cavities;

b. said single unimodal section including aperture means coupling the external source of microwave energy to said first mode;

c. said overall bimodal cylindrical cavity having aperture means such that respective spin samples may be introduced into them;

d. said overall bimodal cylindrical cavities each having aperture means acting as respective second polarized coupling devices such that each of their second modes may be coupled to the respective external microwave detector.

* * * * *